Patented May 1, 1945

UNITED STATES PATENT OFFICE 2,375,163

ADHESIVE COMPOSITION

Joseph F. Zemaitis, Waterbury, Conn., assignor to Dispersions Process, Inc., New York, N. Y., a corporation of Delaware No Drawing. Application May 31, 1940, Serial No. 338,226

2 Claims. (Cl. 260—4)

This invention relates to adhesive rubber-cumaron resin compositions, and more particularly to rubber-cumaron resin compositions containing at least 15% rubber, and method of making same.

According to the Pratt Patent 1,762,194, which is assigned to the present assignee, rubber may be dispersed in resins by first incorporating water and a colloidal dispersing agent, such as glue, colloidal clay, albumen, or casein in a plasticized rubber mass, drying out the water during the compounding or kneading process which incorporates the colloidal dispersing agent in the rubber, and thereafter mixing the rubber containing the dispersing agent with the resin, whereupon the rubber becomes uniformly dispersed in the resin. This process is time consuming in the step of drying out the water added with the colloidal dispersing agent, and excessively so in the case of reclaimed rubber where much less milling is necessary than with crude rubber to break down the rubber to the extent necessary for incorporating in the resin medium. Further, the hydrophilic colloidal dispersing agents in Pratt remain in the final product as water-soluble or water-absorbent materials, which are undesirable because of the tendency to lessen the adhesive bond. By the present invention, which is an improvement over the invention of the Pratt Patent 1,762,194, rubber may be dispersed in cumaron resin by means of water-insoluble material.

In carrying out the present invention, the rubber is dispersed in the cumaron resin by means of a polyvalent metal soap. The rubber is plasticized in any desired manner, as by breaking down on a mill, the polyvalent metal soap intimately mixed with the plasticized rubber, as in an internal mixer, such as a Werner & Pfleiderer, and the cumaron resin and other ingredients added, preferably as small additions with intimate mixing after each addition, whereupon the rubber becomes dispersed in the cumaron resin composition. The amount of rubber should be at least 15% of the final composition in order that it will have the desired flexibility. The rubber content of the composition may be as high as 40% or more, but the amount of cumaron resin in the compound should be at least equal to the rubber content. The rubber and cumaron resin together should comprise at least a major proportion of the composition, and may be in predominating proportion, for example, 75% or more of the composition, or, if desired, the rubber and cumaron resin may comprise substantially the whole of the composition with the exception of the polyvalent-metal soap dispersing agent. In order to readily disperse the rubber in the cumaron resin, the amount of polyvalent-metal soap should be at least 5 parts per 100 parts of rubber, and is preferably in the range of 5 to 25 parts per 100 parts of rubber. The composition may contain vulcanizing and compounding ingredients for the rubber component, and other substances compatible with the cumaron resin, such as gums, bitumens, plasticizers, waxes, or other natural or synthetic resins, for imparting various qualities to the rubber-cumaron resin adhesive composition. Rubber compounding ingredients may be incorporated into the rubber before dispersing in the cumaron resin. The other materials compatible with cumaron resin should be in amount not more than the cumaron content and may be added in small amounts with the cumaron resin or may be added to the cumaron resin prior to mixing with the plasticized rubber mass. If desired, the rubber in which the polyvalent-metal soap has been incorporated may be added to the cumaron resin at room or elevated temperature, but it is preferred to add the cumaron resin and other materials in which the rubber is to be dispersed to the plasticized rubber mass in an internal mixer in small additions as above described. The soap may be a zinc, calcium, magnesium, aluminum or other polyvalent-metal soap of any soap-forming acid, for example, a stearate, abietate, linoleate, or the like. The rubber may be crude or reclaimed natural rubber. Synthetic rubbers, rubber substitutes and other rubber-like materials, are equivalent to natural rubber in the present invention. The term "cumaron resin" is used in its commercial sense as including various resins produced by polymerization of cumaron, or mixtures of cumaron and indene, or mixtures of cumaron, indene, and homologues of cumaron and indene. Rubber-cumaron resin adhesives are hard, strong adhesives with little tendency to cold flow, as distinguished from adhesives made from mixtures or dispersions of rubber with glycerine esters of rosin (ester gums), which show a greater tendency to cold flow and have less adhesive strength.

As illustrative of the present invention, the following examples of various adhesive rubber-cumaron compositions and their preparation are included.

*Example I*

| | Parts by weight |
|---|---|
| Reclaimed rubber | 100 |
| Zinc stearate | 10 |
| Cumaron resin | 200 |

The reclaimed rubber was plasticized by milling on conventional mill rolls until broken down sufficiently to be entirely smooth. The rubber mass was then transferred to a Werner & Pfleiderer mixer and the zinc stearate added with constant kneading, after which the cumaron resin (commercial "Cumar RH") was added to the batch in the mixer in small amounts until the cumaron resin had all been added and a homogeneous dispersion resulted.

Example II

| | Parts by weight |
|---|---|
| Pale crepe | 100 |
| Zinc stearate | 10 |
| Cumaron resin | 250 |
| Paraffin wax | 100 |

The above compound was prepared similarly to Example I with the paraffin wax addition following the addition of the cumaron resin.

Adhesive rubber-cumaron resin compositions prepared according to the process of the present invention may be used as heat sealing adhesives, as for coating and impregnating materials such as cloth, paper, foil, etc., which in turn are to be adhered to some other surface on application of heat. They may also be used as adhesives for fibrous materials, as hair, vegetable felt, wood fiber, synthetic fibers, as in the manufacture of mats, pads, insulation batts, and the like. They may also be used as pressure sensitive adhesives, and for water-proof and moisture-proof coatings.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process of making an adhesive composition containing rubber and cumaron resin which comprises dispersing a plasticized rubber mass containing 5 to 25 parts polyvalent metal soap per 100 parts rubber in a non-aqueous medium comprising a major proportion of cumaron resin, said cumaron resin being in amount at least equal to the rubber, the amount of rubber in the adhesive composition being at least 15%, and the rubber and cumaron resin comprising a major proportion of said composition.

2. The process of making an adhesive composition containing rubber and cumaron resin which comprises preparing a plasticized rubber mass containing 5 to 25 parts polyvalent metal soap per 100 parts rubber and thereafter mixing the plasticized rubber mass with a non-aqueous medium comprising a major proportion of cumaron resin, said cumaron resin being in amount at least equal to the rubber, the amount of rubber in the adhesive composition being at least 15%, and the rubber and cumaron resin comprising a major proportion of such composition.

JOSEPH F. Z MAITIS.